(12) United States Patent
Bosloy et al.

(10) Patent No.: US 8,477,627 B2
(45) Date of Patent: Jul. 2, 2013

(54) CONTENT ROUTING IN DIGITAL COMMUNICATIONS NETWORKS

(75) Inventors: Jonathan Bosloy, Kanata (CA); Duane Pauls, Ottawa (CA); Peter Ashton, Nepean (CA); Wayne Burwell, Ottawa (CA); Craig Betts, Kanata (CA); Greg Bertin, Ottawa (CA); David Pochopsky, Ottawa (CA)

(73) Assignee: Solace Systems, Inc., Kanata, Ontario (CA)

( * ) Notice: Subject to any disclaimer, the term of this patent is extended or adjusted under 35 U.S.C. 154(b) by 1214 days.

(21) Appl. No.: 11/182,756

(22) Filed: Jul. 18, 2005

(65) Prior Publication Data

US 2006/0013230 A1    Jan. 19, 2006

Related U.S. Application Data

(60) Provisional application No. 60/588,797, filed on Jul. 19, 2004.

(51) Int. Cl.
*H04L 12/26* (2006.01)
*H04L 12/28* (2006.01)

(52) U.S. Cl.
USPC ... 370/238; 370/238.1; 370/256; 370/395.21; 370/395.32; 370/395.42; 709/206

(58) Field of Classification Search
USPC .............. 370/395.42, 395.4, 230, 230.1, 231, 370/235, 236, 236.1, 236.2
See application file for complete search history.

(56) References Cited

U.S. PATENT DOCUMENTS

| | | | | |
|---|---|---|---|---|
| 5,430,720 A | * | 7/1995 | Larsson et al. | 370/399 |
| 5,974,417 A | * | 10/1999 | Bracho et al. | 707/10 |
| 6,104,713 A | * | 8/2000 | Nagami et al. | 370/392 |
| 6,298,061 B1 | * | 10/2001 | Chin et al. | 370/400 |
| 6,400,954 B1 | * | 6/2002 | Khan et al. | 455/450 |
| 6,434,155 B1 | * | 8/2002 | Jones et al. | 370/398 |
| 6,600,724 B1 | * | 7/2003 | Cheng | 370/256 |
| 6,798,746 B1 | * | 9/2004 | Kloth et al. | 370/235 |
| 6,816,488 B1 | * | 11/2004 | Merchant et al. | 370/389 |
| 6,901,079 B1 | * | 5/2005 | Phadnis et al. | 370/466 |
| 6,961,342 B1 | * | 11/2005 | Uzun et al. | 370/414 |
| 7,042,842 B2 | * | 5/2006 | Paul et al. | 370/229 |
| 7,068,645 B1 | * | 6/2006 | Phadnis et al. | 370/352 |
| 7,177,295 B1 | * | 2/2007 | Sholander et al. | 370/338 |
| 2001/0056500 A1 | * | 12/2001 | Farber et al. | 709/245 |
| 2002/0016825 A1 | * | 2/2002 | Uchida et al. | 709/207 |
| 2002/0018447 A1 | * | 2/2002 | Yamada et al. | 370/252 |
| 2002/0039352 A1 | * | 4/2002 | El-Fekih et al. | 370/252 |
| 2002/0097747 A1 | * | 7/2002 | Kirkby et al. | 370/468 |
| 2002/0129158 A1 | * | 9/2002 | Zhang et al. | 709/234 |
| 2002/0141393 A1 | * | 10/2002 | Eriksson et al. | 370/352 |
| 2003/0007455 A1 | * | 1/2003 | Kohzuki et al. | 370/230.1 |
| 2003/0048778 A1 | * | 3/2003 | Davison | 370/389 |
| 2003/0053464 A1 | * | 3/2003 | Chen et al. | 370/400 |
| 2003/0084021 A1 | * | 5/2003 | Dweck et al. | 707/1 |

(Continued)

*Primary Examiner* — Faruk Hamza
*Assistant Examiner* — Andrew Oh
(74) *Attorney, Agent, or Firm* — Marks & Clerk; Richard J. Mitchell

(57) ABSTRACT

A method of assigning a priority to a document in a content-routed network including a plurality of routers interconnected by links, involves matching rules against the content of a received document to assign a priority, mapping the priority onto an egress link, and mapping the egress links onto the interconnect network between content routers to achieve end-to-end quality of service.

35 Claims, 11 Drawing Sheets

S=SUBSCRIBER
P=PUBLISHER
CR=CONTENT ROUTER

U.S. PATENT DOCUMENTS

| | | | |
|---|---|---|---|
| 2003/0099237 A1* | 5/2003 | Mitra et al. | 370/393 |
| 2003/0118026 A1* | 6/2003 | Kuhl et al. | 370/395.21 |
| 2003/0128708 A1* | 7/2003 | Inoue et al. | 370/395.42 |
| 2003/0133417 A1* | 7/2003 | Badt, Jr. | 370/254 |
| 2003/0135556 A1* | 7/2003 | Holdsworth | 709/206 |
| 2003/0142680 A1* | 7/2003 | Oguchi | 370/400 |
| 2003/0182234 A1* | 9/2003 | Degroot | 705/51 |
| 2003/0204449 A1* | 10/2003 | Kotas et al. | 705/27 |
| 2004/0010752 A1* | 1/2004 | Chan et al. | 715/513 |
| 2004/0044780 A1 | 3/2004 | Eastham | 709/229 |
| 2004/0057437 A1* | 3/2004 | Daniel et al. | 370/395.43 |
| 2004/0190526 A1* | 9/2004 | Kumar et al. | 370/395.21 |
| 2004/0210663 A1* | 10/2004 | Phillips et al. | 709/230 |
| 2004/0226002 A1* | 11/2004 | Larcheveque et al. | 717/126 |
| 2004/0240658 A1* | 12/2004 | Delaney et al. | 379/229 |
| 2004/0250059 A1* | 12/2004 | Ramelson et al. | 713/150 |
| 2004/0260683 A1* | 12/2004 | Chan et al. | 707/3 |
| 2005/0005021 A1* | 1/2005 | Grant et al. | 709/232 |
| 2005/0021548 A1* | 1/2005 | Bohannon et al. | 707/101 |
| 2005/0105560 A1* | 5/2005 | Mann et al. | 370/503 |
| 2005/0160171 A1* | 7/2005 | Rabie et al. | 709/227 |
| 2005/0243732 A1* | 11/2005 | Bitar et al. | 370/241.1 |

* cited by examiner

CR = CONTENT ROUTER

CR = CONTENT ROUTER

CR = CONTENT ROUTER

CR = CONTENT ROUTER

CR = CONTENT ROUTER

CONTENT ROUTING IN DIGITAL COMMUNICATIONS NETWORKS

CROSS REFERENCE TO RELATED APPLICATION

This application claims the benefit under 35 USC 119(e) of prior U.S. application No. 60/588,797, filed Jul. 19, 2004, the contents of which are herein incorporated by reference.

FIELD OF THE INVENTION

This invention relates to the field of implicit or content routing in digital communications networks, and in particular to quality of service for content routing.

BACKGROUND OF THE INVENTION

Content-based networks are described in A. Carzaniga, M. J. Rutherford, A. L. Wolf, A routing scheme for content-based networking, Department of Computer Science, University of Colorado, June 2003.

The field of "Implicit Routing" (or "content routing") is an emerging networking technology. Implicit Routing is the act of forwarding customer data based on the content, rather than a networking header specifying an explicitly addressed destination.

FIG. 1 illustrates an exemplary content-routed network as implemented according to the prior art. The exemplary content-routed network 1 is composed of plurality of content-routers CR 2, 3, 4 and 5, a plurality of publishers P 11, 12 and 13, and a plurality of subscribers S 21, 22, 23, 24, 25, 26, 27 and 28.

A content router is a digital communications networking device which forwards content based on inspection of the contents of a message or document, rather than on an explicit destination address in the networking header of a packet or frame. An example of such a device is the 3200 multiservice message router from Solace Systems, Inc. Content routers must have connections between themselves so that they can communicate with each other and exchange both information needed to control the network, as well as to carry the content received from publishers from one content router to the next, in order to deliver it to the subscribers in the network that are interested in the content. In FIG. 1, link 43 connects content routers 2 and 3; link 46 connects content routers 3 and 4; link 48 connects content routers 4 and 5; and link 49 connects content routers 2 and 5. Such a link could be accomplished using a variety of technologies, examples of which are:

A Transmission Control Protocol (TCP) connection across an IP network
An MPLS circuit across an MPLS network
A direct physical link, such as a serial line, Ethernet link, SONET link, etc.
A virtual circuit across an Asynchronous Transfer Mode (ATM) network
A virtual circuit across a Frame Relay network
A virtual layer 2 circuit across an Ethernet network
Wireless Local Area Network as per 802.11 (e.g. 802.11a, 802.11b, or 802.11g)

A publisher is a computer, user or device that can insert content into the network. Another name commonly used in the literature is an event source or a producer. A publisher connects to a content router over a link, using a variety of techniques as explained above, and then the publisher can inject content into network 1. For example, link 41 connects publisher 11 to content router 2.

A subscriber is a computer, user or device that has expressed interest in some specific content. Another name commonly used in the literature is event displayers or consumers. A subscriber connects to a content router over a link, using a variety of techniques as explained above, and then the subscriber can receive content from the network 1. For example, link 42 connects subscriber 22 to content router 2.

FIG. 1 also illustrates an example of content from publisher 11 being injected into the content routed network 1. Publisher 11 sends a document 61A to content router 2. Such a document can be delivered using a variety of protocols, such as TCP, HTTP, SMTP, etc. The term "document" is used throughout in the most general sense to cover any type of content, including multi-media content. Content router 2 receives the document, and matches the contents of the document against its forwarding table. The forwarding table is comprised of a series of expressions that indicates matching conditions against the contents of received documents. For example, for documents formatted as Extensible Markup Language (XML) (refer to Extensible Markup Language (XML) 1.0 (Third Edition)", W3C Recommendation 4 Feb. 2004, W3C (World Wide Web Consortium)) a suitable subscription syntax is XML Path Language (XPath) (refer to reference "XML Path Language (XPath) Version 1.0", W3C Recommendation 16 Nov. 1999, W3C (Word Wide Web Consortium)).

The manner in which a content router learns of subscriptions from other routers in the network, and routes an incoming document to the correct set of egress links, is outside the scope of the present invention. One such scheme is described in our co-pending application Ser. No. 11/012,113 entitled "Implicit Routing in Content Based Networks", as well as to "A. Carzaniga, M. J. Rutherford, A. L. Wolf, A routing scheme for content-based networking, Department of Computer Science, University of Colorado, June 2003", the contents of both which are herein incorporated by reference.

In the prior art, content routers typically utilize a single link between a pair of routers, where link is taken to be a logical construct which can equate to a physical link, a virtual circuit, a TCP connection, etc. All traffic to be forwarded between the two routers utilizes the same link.

In FIG. 1, publisher 11 sends document 61A over link 41 to content router 2. In this example, content router 2 compares the full content of the document against its internal content forwarding table, and computes that locally attached subscriber 22 requires a copy of the document, but local subscriber 21 does not. In addition, one or more subscribers that are preferentially reachable via link 43 require a copy of the document, while no subscribers that require a copy of the document are preferentially reachable over link 49. As a result, content router 2 sends a copy 61B of the document over link 42 towards subscriber 22, and sends a copy 61C of the document over link 43 towards content router 3. Content router 3 repeats the process, and sends a copy 61D of the document over link 44 to subscriber 23, a copy 61E over link 45 to subscriber 25, and a copy 61F over link 46 towards content router 4. Finally, content router 4 repeats the process and delivers a copy 61G of the document over link 47 to subscriber 26. Note that a single copy of the document is sent over a link between content routers, regardless of the number of subscribers downstream that require the document.

While the prior art addresses the publish/subscribe service, allowing publishers and subscribers to remain decoupled from one another, it does not address the issue of quality of service. Again considering the example network of FIG. 1, it can be seen that any document travelling over link 43 between content router 2 and content router 3 will receive that same quality of service from the underlying transport network. However, a given document transported by the content-routed network may have significantly more importance and quality of service requirements, e.g. latency, than other documents delivered over the same infrastructure.

SUMMARY OF THE INVENTION

The invention provides a method of content-routing or implicit routing across a plurality of content routers that provides differentiated quality of service for various content being routed.

According to the present invention there is provided a method of handling documents in a content-based network including a plurality of content-based routers wherein one or more of said content-based routers serve as ingress routers, said method comprising storing a set of rules defining the assignment of priority to documents in accordance with attributes of said documents; assigning a priority to an incoming document from a publisher at a said ingress router by comparing an attribute of an incoming document against said stored set of rules; and routing said incoming document in accordance with its assigned priority to provide quality-of-service control in the content-based network.

The invention allows this quality of service differentiation to occur based on any of the content of a given document to be routed, and can interoperate with a variety of networking technologies that is used to interconnect the content routers.

In another aspect the invention the invention provides a content-based network comprising a plurality of content-based routers interconnected by links, wherein one or more of said content-based routers constitute ingress routers, wherein said ingress routers are configured to store a set of rules defining the assignment of priority to documents in accordance with their attributes; wherein said ingress routers are configured to assign a priority to incoming documents by comparing an attribute of an incoming document against said stored set of rules; and wherein said content-based routers are configured to route said incoming document in accordance with its assigned priority to provide quality-of-service control in the content-based network.

In yet another aspect the invention provides a content-based router for use as an ingress router in a content routed network, comprising a memory for storing a set of rules defining the assignment of priority to documents in accordance with their attributes; and a processor programmed to compare an attribute of an incoming document against said stored set of rules and assign a priority to said incoming document based on said comparison, whereby said document can be routed through the network in accordance with its assigned priority to provide quality-of-service control in the network.

BRIEF DESCRIPTION OF THE DRAWINGS

The invention will now be described in more detail, by way of example only, with reference to the accompanying drawings, in which:—

DETAILED DESCRIPTION OF THE PREFERRED EMBODIMENTS

In an exemplary embodiment, a content router routes documents formatted as Extensible Markup Language (XML) (refer to Extensible Markup Language (XML) 1.0 (Third Edition)", W3C Recommendation 4 Feb. 2004, W3C (World Wide Web Consortium)) and utilizes subscriptions based on XML Path Language (XPath) (refer to reference "XML Path Language (XPath) Version 1.0", W3C Recommendation 16 Nov. 1999, W3C (Word Wide Web Consortium)). Publishers connect to the content router via HTTP over TCP, although other connection methods are possible such as SMTP, FTP, TCP, etc.

Figure 1:
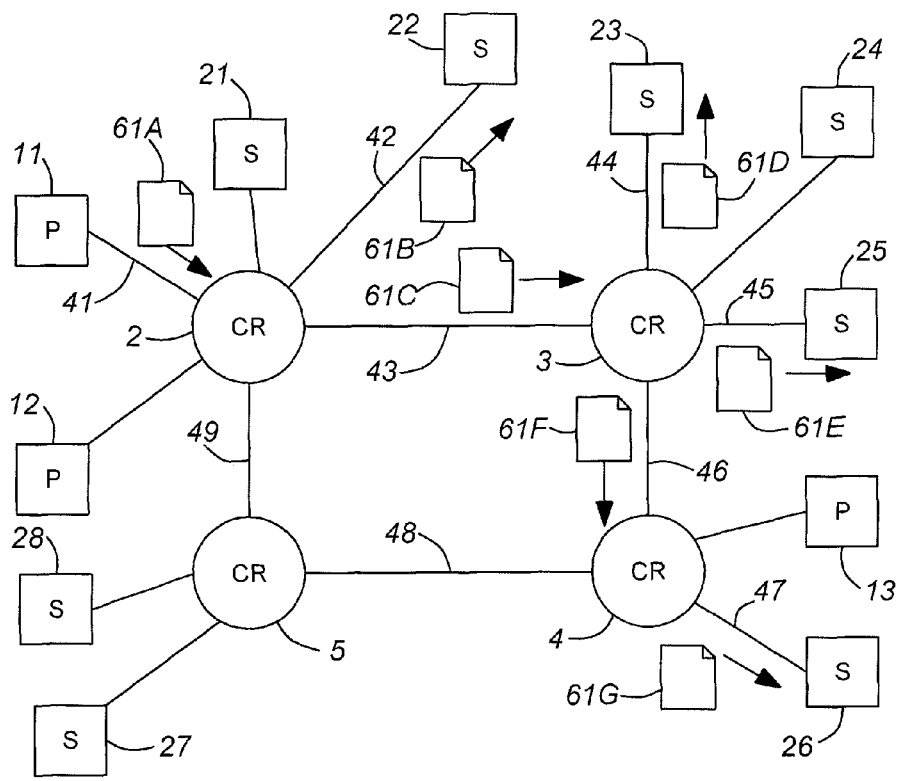
FIG. 1 shows one example of a prior art Content-Routed Network.

In FIG. 1, a publisher such as 11 sends a document such as 61A to the content router 2 over link 41 using HTTP, such as by using an HTTP POST message. The content router 2 processes the message and then sends an HTTP response back to publisher 11 indicating whether the POST operation was successful or not. The HTTP request (carrying the document) from the publisher to the content router, and the HTTP response from the content router back to the publisher, are carried over the same TCP link 41.

Similarly, content router 2 sends document 61B to subscriber 22 over link 42 using HTTP, such as by using an HTTP POST message. The subscriber 22 processes the message and then sends an HTTP response back to the content router 2 indicating whether the POST operation was successful or not. The HTTP request (carrying the document) from the content router to the subscriber, and the HTTP response from the subscriber back to the content router, are carried over the same TCP link 42.

Figure 2:
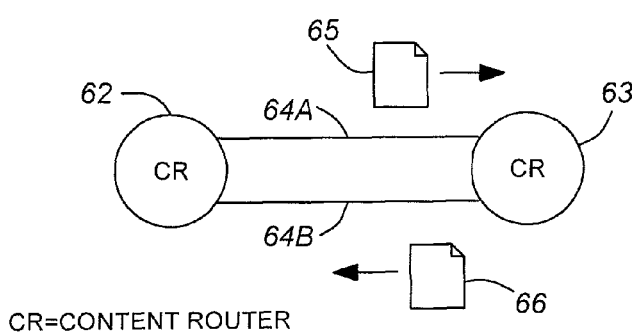
FIG. 2 shows a pair of TCP links between content routers.

A link between a pair of content routers could actually be realized by a pair of TCP connections, as is shown in FIG. 2. In FIG. 2, content routers 62 and 63 are connected by a pair of TCP connections to form a logical link. TCP connection 64A is used to send an HTTP request from content router 62 to content router 63 in order to deliver a document from content router 62 to content router 63, such as document 65. The same TCP connection 64A is used to send an HTTP response from content router 63 back to content router 62. Similarly, TCP connection 64B is used to send an HTTP request from content router 63 to content router 62 in order to deliver a document from content router 63 to content router 62, such as document 66. The same TCP connection 64B is used to send an HTTP response from content router 62 back to content router 63. In this way, a given TCP connection is only used to send an HTTP request message in one direction, and an HTTP response message in the opposite direction, as is known in the art.

An alternative approach is to use a single TCP connection between content routers, and to multiplex HTTP request messages and HTTP response messages in a given direction on the link.

In all subsequent figures, a single link is shown between content routers to carry documents in both directions. However, such a link can be actually implemented using a pair of links to separate HTTP requests in each direction as described above.

Figure 16:
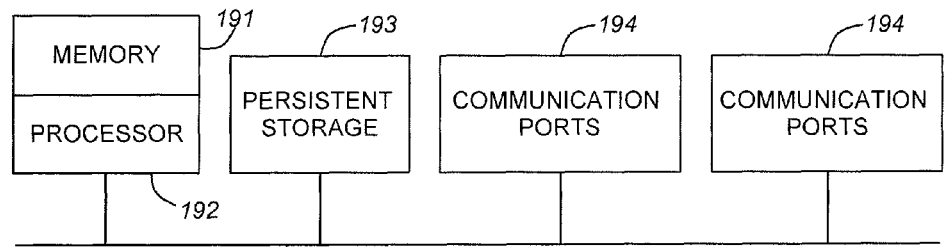
FIG. 16 shows a block diagram of a router that may be used in this invention.

FIG. 16 shows a block diagram of an exemplary content router 190 of the present invention, which includes a (or many) central processing unit (CPU) 192 with associated memory 191, persistent storage 193, a plurality of communication ports 194, and a communication bus 195. The processor 192 is responsible for tasks such as running content routing protocols, computing routing tables, processing received documents, assigning priority to received documents, and routing them based on content and priority (which may involve specialized hardware assist which is outside the scope of this invention), and other router tasks known in the art. The associated memory 191 is used to hold the instructions to be executed by processor 192 and data structures such as routing tables and priority assignment rules. The persistent storage 193 is used to hold configuration data for the router, event logs, and programs for the processor 192. The persistent storage 193 may be redundant hard disks, flash memory disks or other similar devices. The communication ports 194 are the ports which the router uses to communicate with other devices, such as other routers and hosts (publishers and subscribers). Many different technologies can be used, such as Ethernet, Token Ring, SONET, ATM, etc. The communications bus 195 allows the various router components to communicate with one another, and may be a PCI bus (with associated bridging devices) or other inter-device communication technologies known in the art.

Assignment of Priority to a Received Document

The first step in providing quality of service is to determine the required quality of service of a document received from a publisher. This determination indicates the quality of service to be given to the document as it is routed from the publisher towards all content routers that service interested subscribers and then finally to deliver the document to the subscriber(s). This is done by applying a quality of service filter to each incoming document, expressed using XPATH expressions. In the description, the term "document" refers to a piece of content that is being content-routed by the content-routing network. It can be any type of content that is produced by a content producer and delivered to subscribers.

The quality of service of a document is expressed as a priority value, with four possible values 0 through 3. The definition of these values is shown in Table 1. Four priority levels are provided to balance the desire for more levels of differentiation with the desire to simplify the overall network configuration and control. A different number of priority values could be utilized without changing the present invention.

TABLE 1

| Priority Definitions | |
| --- | --- |
| Priority Value | Meaning |
| 0 | Lowest priority |
| 1 | Second lowest priority |
| 2 | Second highest priority |
| 3 | Highest priority |

Figure 3:
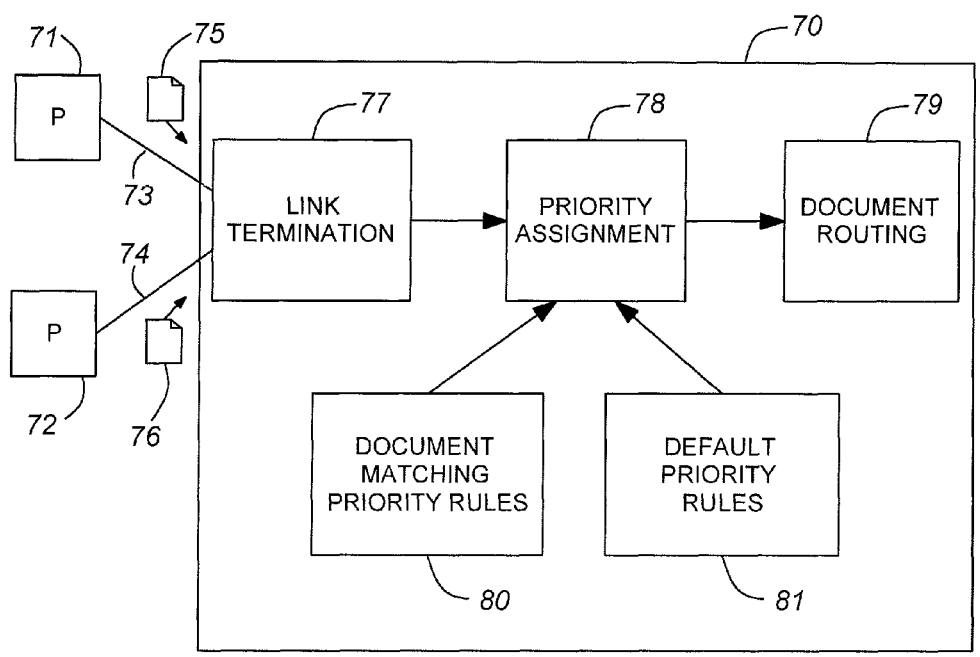
FIG. 3 is a diagram illustrating priority assignment.

FIG. 3 illustrates how priorities are assigned to an incoming XML document. The content router 70 has a link 73 to publisher 71, and a link 74 to publisher 72. Links 73 and 74 are implemented over physical communication ports 194, with each communication port 194 supporting a plurality of links. Publisher 71 sends a document 75 to the content router 70. In the content router 70, the link termination block 77 terminates the links from publishers. The method for doing this depends upon the protocol being used between the publisher and the content router. In the preferred embodiment, the connection is done using HTTP over TCP. The document is received into memory 191, and then is passed to the priority assignment block 78. The priority assignment block uses document matching priority rules 80 and default priority rules 81, along with the received document, to assign a priority (in the range of 0 through 3 as per table 1) to the document. The document is then handled off to the document routing block 79 for further routing. The document matching priority rules 80 and the default priority rules 81 are stored as configuration in persistent storage 193 (so that they survive a router restart, power outage, etc.), and can also be stored in memory 191 for fast access by processor 192 during router operation.

Note that in addition to matching the content of the document against a set of priority rules, a content router must also match the document against a set of subscriptions in order to route the document towards locally attached subscribers, or towards other content routers who in turn will route the document towards the interested end subscribers. This matching could be done as a separate step, or could be done in parallel with the priority assignment of block 78. In the preferred embodiment it is done as part of block 78, i.e. this block both assigns priorities to documents and determines where the document must be routed based on subscriptions. Block 79 then determines what egress links the document must be sent on given this information. Note that the general method of content routing is outside the scope of this invention.

An example of the data held in the Document Matching Priority Rules 80 is shown in Table 2. Each rule consists of three elements: a publisher ID 90, indicating which publisher this rule applies to, where a special value of * in the figure indicates a wildcard matching any publisher; an XPath Expression 91, indicating the specific XPath expression that is to be matched against the content of the received document; and an assigned priority 92, indicating the priority to be assigned to the document if the rule matches. In the example rule configuration of FIG. 4, rules 93, 94, and 95 apply to publisher 71, rules 96 and 97 apply to publisher 72, and rules 98 and 99 are rules that apply to all publishers. The assigned priority 92 takes on one of the values as defined in table 1.

TABLE 2

Document Matching Priority Rules

| | Publisher ID (90) | Xpath Expression (91) | Assigned Priority (92) |
|---|---|---|---|
| 93 | 71 | /cXML//OrderRequestHeader//Money[text( )>100] | 2 |
| 94 | 71 | /cXML//OrderRequestHeader | 1 |
| 95 | 71 | /cXML//StatusUpdateRequest | 1 |
| 96 | 72 | /cXML//OrderRequestHeader//Money[text( )>200] | 3 |
| 97 | 72 | /cXML/Request/SupplierDataRequest | 1 |
| 98 | * | /cXML | 0 |
| 99 | * | /cXML//OrderRequestHeader//Money[text( )>100] | 1 |

An example of the information held in the Default Priority Rules 81 is shown in table 3. Each entry consists of two elements: a publisher ID 100, indicating which publisher this rules applies to, where a special value of * in the figure indicates a wildcard matching any publisher; and an assigned priority 101 indicating the priority to be assigned to the document if the rule matches. The assigned priority 101 takes on one of the values as defined in table 1. Note that in the default priority rules, a given publisher ID may only appear zero or one times. In addition, there is always exactly one entry for the wildcard (*) publisher ID.

TABLE 3

Default Priority Rules

| | Publisher ID (100) | Assigned Priority (101) |
|---|---|---|
| 102 | 71 | 0 |
| 103 | * | 0 |

Figure 4:
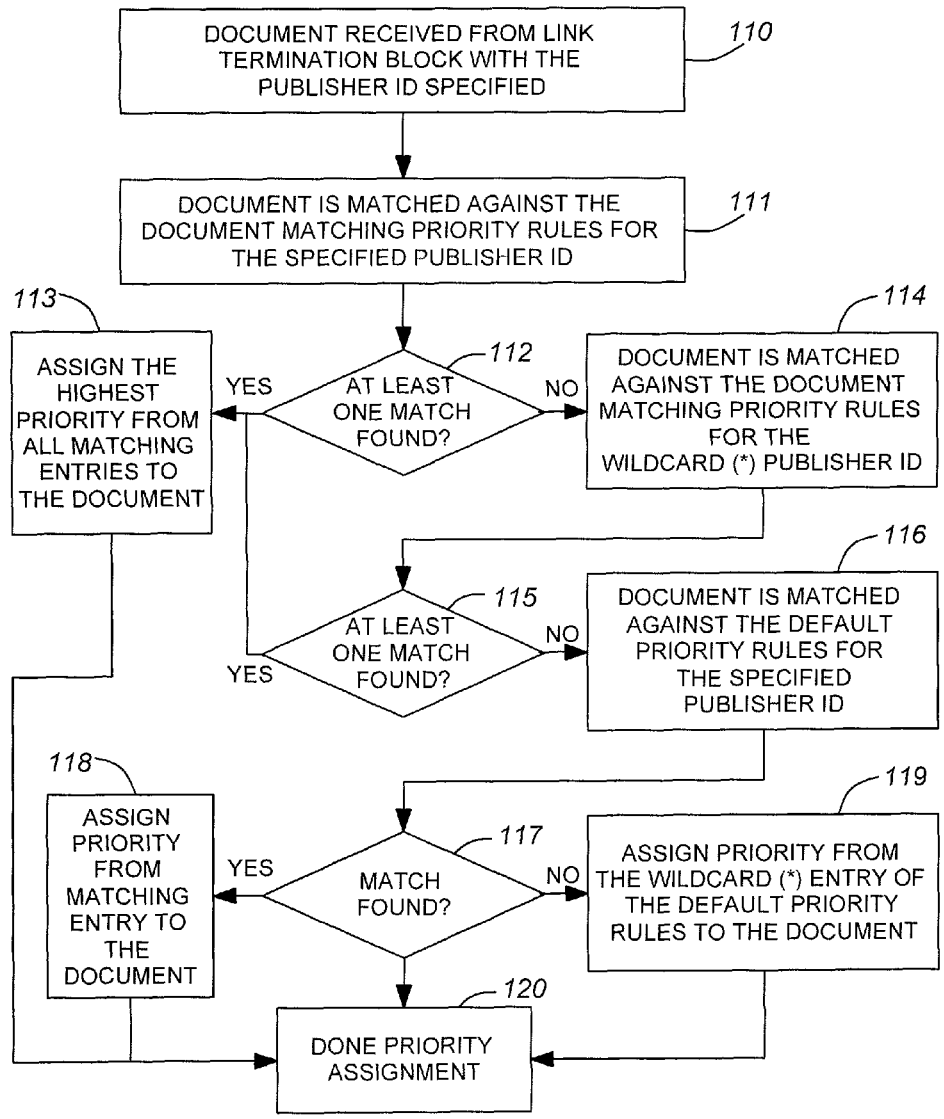
FIG. 4 shows an algorithm for a priority assignment block.

The algorithm used by the Priority Assignment Block 78 is shown in FIG. 4. Starting at step 110, a document is received from the Link Termination Block 77. The publisher ID from which the document was received is provided by the Link Termination Block along with the document. At step 111, the document is matched against each XPath Expression for the specified publisher ID from the Document Matching Priority Rules stored in block 80. Note that there may be many such entries to match against, or no entries at all for the specified publisher ID. Step 112 checks if any entries were found to match in step 111. If at least one entry was found to match, then the algorithm proceeds to step 113. In step 113, the highest priority of all matching entries is selected and assigned, and the algorithm then completes at step 120. If Step 112 determines that no match occurred, then the algorithm proceeds to step 114, where the document is matched against any entries in the Document Matching Priority Rules for a wildcard (*) publisher ID. Note that there may be many such entries or no entries at all, for the wildcard publisher ID. Step 115 determines if any matches were found from step 114. If any matches were found, step 113 is executed next as previously described. Otherwise, the algorithm proceeds to step 116. In step 116, the document is matched against the specified publisher ID for the document against the entries of the Default Priority Rules of block 81. There can be exactly zero or one such rule for a given publisher ID. Step 117 checks to see if a matching publisher ID was found. If so, step 118 assigns the priority specified by the rule to the document, and the algorithm completes at step 120. Otherwise, in step 119, the priority specified by the wildcard (*) entry in the Default Priority Rules is assigned to the document. Note that there is always exactly one such entry. Then, the algorithm completes at step 120.

In block 78, a series of XPath expressions must be matched against the content of the document to determine whether the rule matches the received document. The method of applying an XPath expression against an XML document is well known in the art, and is widely available in both commercial and open-source software packages. In the simplest case, each XPath expression could be applied to the document one-by-one to see which match. However, in the presence of a large number of rules, the matching should be done in parallel for maximum performance. Two example algorithms known in the art for the application of a large number of XPath expressions against XML documents are as follows:

"Path Sharing and Predicate Evaluation for High-Performance XML Filtering", Yanlei Diao, University of California, Berkeley; Mehmet Altinel, IBM Almaden Research Center, Michael J. Franklin, Hao Zhang, University of California, Berkeley; Peter Fischer, University of Heidelberg.

"Efficient filtering of XML documents with XPath expressions", Chee-Yong Chan, Pascal Felber, Minos Garofalakis, Rajeev Rasogi; Bell Laboratories, Lucent Technologies; December 2002.

This algorithm of FIG. 4 first uses the highest priority rule that matches the content of the document for the specified publisher ID. If no matching rule exists, the highest priority rule for the wildcard (*) publisher ID that matches the document is used. Thus, any matching rule that is specific to the publisher ID is used instead of any rule for the wildcard publisher ID, regardless of the assigned priority. If no rules are still found to match the content, then the priority is assigned based on the Default Priority Rules. Once again, a rule that is specific to the publisher ID is used in preference to the wildcard (*) rule.

An exemplary XML document is described below. If the document was to be received from publisher 71, the document matching priority rules of Table 2 would be consulted. Rules 93, 94, and 95 would be consulted since they apply to publisher 71. For the example document, rules 93 and 94 would match the content of the document. Then, rule 93 would be selected since it has the highest priority of matching rules. Thus, the document would be assigned a priority of 2.

If the same document was to be received from publisher 72, rules 96 and 97 would be considered, since they apply to publisher 72. Neither matches the document, so then rules 98 and 99 would be considered, since they are for the wildcard (*) publisher ID. Rules 98 and 99 would be found to match, and so the document would be assigned a priority of 1 (the highest priority of all matching rules).

Exemplary XML Document

```
<?xml version="1.0" encoding="UTF-8"?>
<!DOCTYPE cXML SYSTEM "http://xml.cXML.org/schemas/cXML/1.2.009/cXML.dtd">
<cXML payloadID="32232995@example.com"
timestamp="2000-10-12T18:39:09-08:00" xml:lang="en-US">
<Header>
<From>
        <Credential domain="exampleCOMUserID"
        type="marketplace">
        <Identity>bigadmin@marketplace.org</Identity>
        </Credential>
        <Credential domain=" exampleCOMUserID ">
        <Identity>admin@acme.com</Identity>
        </Credential>
</From>
<To>
        <Credential domain="DUNS">
        <Identity>942888711</Identity>
        </Credential>
</To>
<Sender>
        <Credential domain=" exampleCOMUserID ">
        <Identity>sysadmin@example.com</Identity>
        <SharedSecret>abracadabra</SharedSecret>
        </Credential>
        <UserAgent>CSN 33</UserAgent>
</Sender>
</Header>
<Request deploymentMode="test">
<OrderRequest>
        <OrderRequestHeader orderID="DO1234"
        orderDate="2000-10-12"
        type="new">
<Total>
<Money currency="USD">187.60</Money>
</Total>
<ShipTo>
<Address>
        <Name xml:lang="en">Acme</Name>
        <PostalAddress name="default">
        <DeliverTo>Joe Smith</DeliverTo>
        <DeliverTo>Mailstop M-543</DeliverTo>
        <Street>123 Anystreet</Street>
        <City>Sunnyvale</City>
        <State>CA</State>
        <PostalCode>90489</PostalCode>
        <Country isoCountryCode="US">United States
        </Country>
        </PostalAddress>
</Address>
</ShipTo>
<BillTo>
<Address>
        <Name xml:lang="en">Acme</Name>
        <PostalAddress name="default">
        <Street>123 Anystreet</Street>
        <City>Sunnyvale</City>
        <State>CA</State>
        <PostalCode>90489</PostalCode>
        <Country isoCountryCode="US">United States
        </Country>
        </PostalAddress>
</Address>
</BillTo>
<Payment>
<PCard number="1234567890123456"
        expiration="2001-03-12"/>
</Payment>
<Comments xml:lang="en-US">Anything well formed in XML.
</Comments>
</OrderRequestHeader>
<ItemOut quantity="10" requestedDeliveryDate="2000-10-18"
        lineNumber="1">
<ItemID>
<SupplierPartID>1233244</SupplierPartID>
```

-continued

```
</ItemID>
<ItemDetail>
<UnitPrice>
        <Money currency="USD">1.34</Money>
</UnitPrice>
<Description xml:lang="en">hello from item 1
</Description>
<UnitOfMeasure>EA</UnitOfMeasure>
<Classification domain="SPSC">12345</Classification>
<ManufacturerPartID>234</ManufacturerPartID>
<ManufacturerName>foobar</ManufacturerName>
<URL>www.foo.com</URL>
</ItemDetail>
</ItemOut>
<ItemOut quantity="20" requestedDeliveryDate="2000-10-18"
        lineNumber="4">
<ItemID>
<SupplierPartID>1233245</SupplierPartID>
</ItemID>
<ItemDetail>
<UnitPrice>
        <Money currency="USD">2.68</Money>
</UnitPrice>
<Description xml:lang="en">hello from item 4
</Description>
<UnitOfMeasure>EA</UnitOfMeasure>
<Classification domain="SPSC">12346</Classification>
<ManufacturerPartID>235</ManufacturerPartID>
<ManufacturerName>foobar</ManufacturerName>
<URL>www.foo.com</URL>
</ItemDetail>
</ItemOut>
<ItemOut quantity="30" requestedDeliveryDate="2000-10-18"
        lineNumber="5">
<ItemID>
<SupplierPartID>1233246</SupplierPartID>
</ItemID>
<ItemDetail>
<UnitPrice>
        <Money currency="USD">4.02</Money>
</UnitPrice>
        <Desrciption xml:lang="en">hello from item 5
        </Description>
        <UnitOfMeasure>EA+21 /UnitOfMeasure>
        <Classification domain="SPSC">12347</Classification>
        <ManufacturerPartID>236</ManufacturerPartID>
        <ManufacturerName>foobar</ManufacturerName>
        <URL>www.foo.com</URL>
        </ItemDetail>
        </ItemOut>
</OrderRequest>
</Request>
</cXML>
```

Tagging the Document with the Assigned Document Priority

The document priority of the document that has been assigned by the ingress content router is sent, along with the document, to other content routers in the network. This is done so that:

The processing involved in assigning a document priority only has to be done once at the ingress of the content-routed network.

A given ingress content router only has to be aware of the rules associated with publishers to which it is directly attached.

The manner in which the priority of a document is signalled from one content router to another is described in our copending patent application Ser. No. 11/012,168. Note that a downstream content router, according to a local policy, could choose to over-ride the priority already assigned to the document by an upstream content router, and re-compute a new priority for the document according to local policies. This can be useful if a document is handed off from administrative domain to another, or if the downstream content router has policy information that is not available to the upstream content router that affects assignment of document priority.

Routing Based on Document Priority

Figure 5:
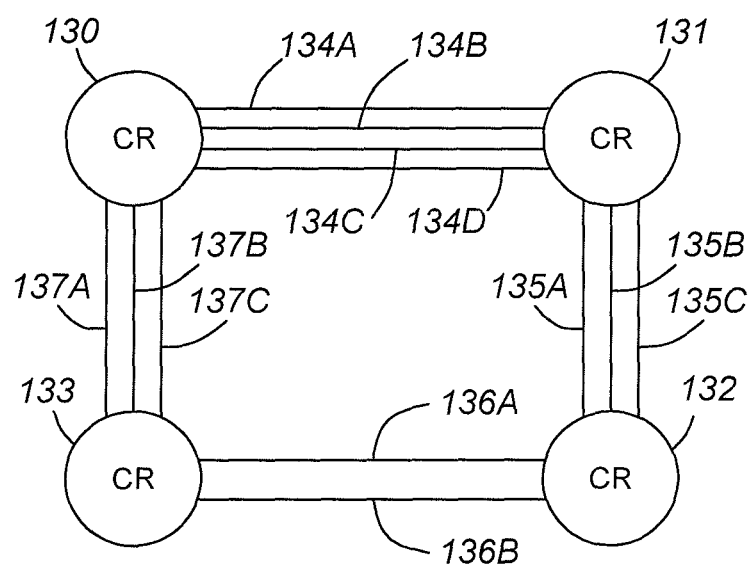
FIG. 5 shows a network using multiple links between content routers.

Instead of utilizing a single link between content routers as per the prior art of FIG. 1, multiple links are instead utilized as shown in FIG. 5. Between one and four links can be utilized between a given pair of routers. The maximum of four comes from the fact that in the preferred embodiment four priority values are supported, as per Table 1. In this example, four links 134A, 134B, 134C and 134D are utilized between content routers 130 and 131; three links 135A, 135B and 135C are utilized between content routers 131 and 132; two links 136A and 136B are utilized between content routers 132 and 133; and three links 137A, 137B and 137C are utilized between content routers 133 and 130.

Each link is provisioned to carry a range of document priorities. A given priority can only be assigned to a single link between a given pair of routers. A link can be provisioned to carry one or more priorities. An exemplary assignment of priorities to the links of FIG. 5 is shown in table 4. For example, in Table 4, link 134A is configured to only carry document of priority 0, while link 135B is provisioned to carry documents of priority 1 or 2. Note that each link is also assigned a link cost metric, which is used to control the routes taken. The link cost metric is described in the patent application "Implicit Routing in Content Based Networks" referred to above. A lower cost metric is preferred over a higher cost metric.

As part of the content routing functionality, a source-based spanning tree is constructed with each content router at the root. The method for doing this is described in the patent application "Implicit Routing in Content Based Networks". The addition of priority-based quality of service support, and the use of multiple links between routers as per FIG. 5 and Table 4, means that the routing protocol now has more links to distribute in the network, and each link will also have a list of priorities supported by that link. This requires a slight extension to the routing protocol of the referenced patent application. When the links in the network are being distributed by the routing protocol, each link must have an additional attribute that indicates the list of priorities supported by that link, in addition to the other attribute information already available for each link, such as the link cost metric. This allows the routing function to now compute a per-source, per-priority spanning tree, as opposed to the previous per-source spanning tree. Note that while the term "spanning tree" is used in this description, it will be understood that several techniques can be used to calculate the forwarding paths, for example a shortest path calculation (such as Dijkstra's Algorithm) or other graph techniques. Equal cost multipath is also supported as described in Ser. No. 11/012,113. The key point is that a per-priority forwarding table is constructed.

TABLE 4

Mapping of document priorities to links

| Link | Priorities Carried | Link Cost |
|---|---|---|
| 134A | 0 | 5 |
| 134B | 1 | 1 |
| 134C | 2 | 2 |
| 134D | 3 | 1 |
| 135A | 0 | 1 |
| 135B | 1, 2 | 1 |
| 135C | 3 | 1 |
| 136A | 0, 1 | 2 |
| 136B | 2, 3 | 1 |
| 137A | 0 | 1 |
| 137B | 1, 2 | 1 |
| 137C | 3 | 4 |

Figure 6:
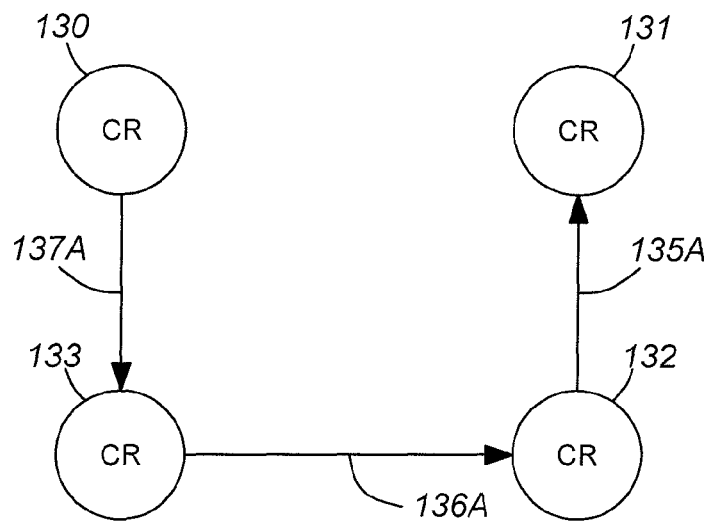
FIG. 6 shows a priority 0 spanning tree for a source content router.
Figure 7:
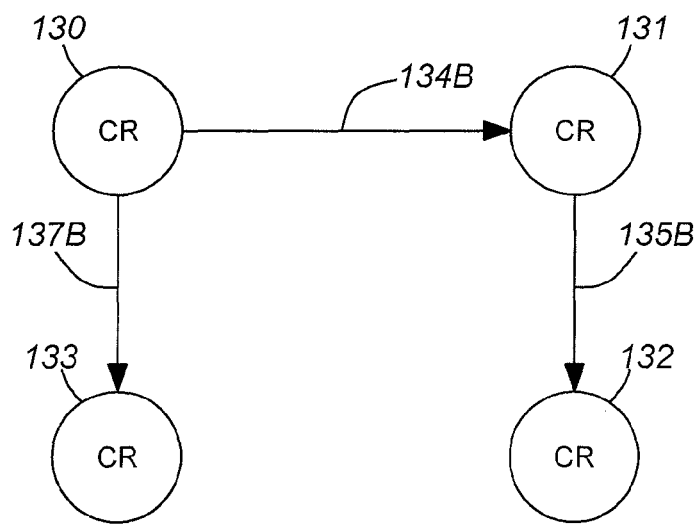
FIG. 7 shows a priority 1 spanning tree for a source content router.
Figure 8:
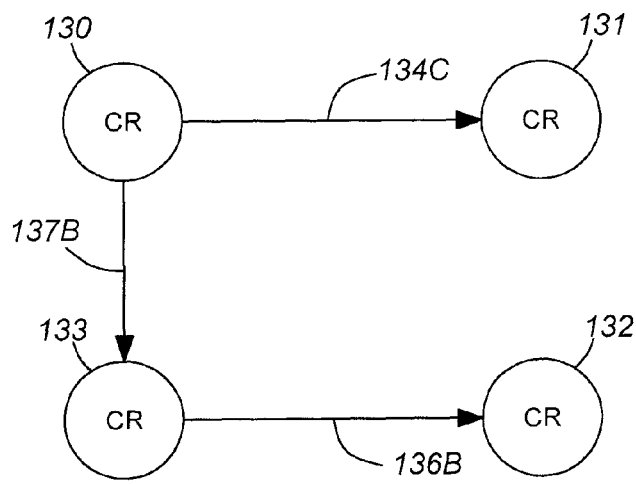
FIG. 8 shows a priority 2 spanning tree for a source content router.
Figure 9:
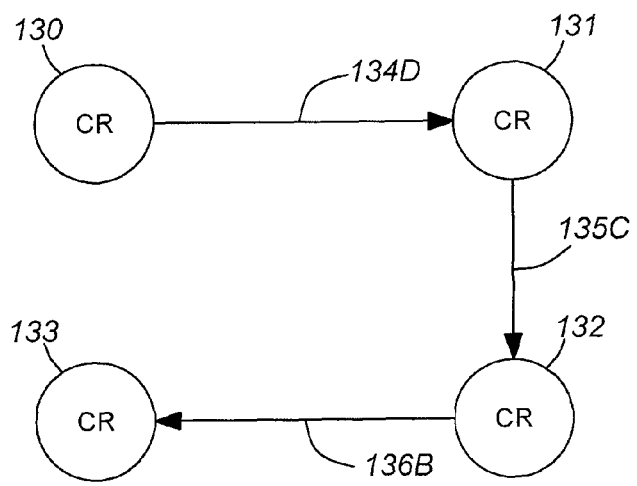
FIG. 9 shows a priority 3 spanning tree for a source content router.

Given the links of Table 4, the per-priority spanning trees with content router 130 as the source router (tree root) is shown in FIG. 6 for priority 0, FIG. 7 for priority 1, FIG. 8 for priority 2, and FIG. 9 for priority 3. Note that in these figures, the labels of the content routers and links is the same as for FIG. 5. In FIG. 6, for document priority 0, traffic from content router 130 to content router 131 travels via content routers 133 and 132 over links 137A, 136A and 135A. This is due to the fact that link 134A has a link cost of 5 (see Table 4), and thus is not the preferred route.

Armed with this information, the document routing block 79 of FIG. 3 can determine which link to send the document on, given the document's assigned priority, and the list of destination content routers that need the document. The determination of the list of destination content routers is outside the scope of the present invention.

Figure 10:
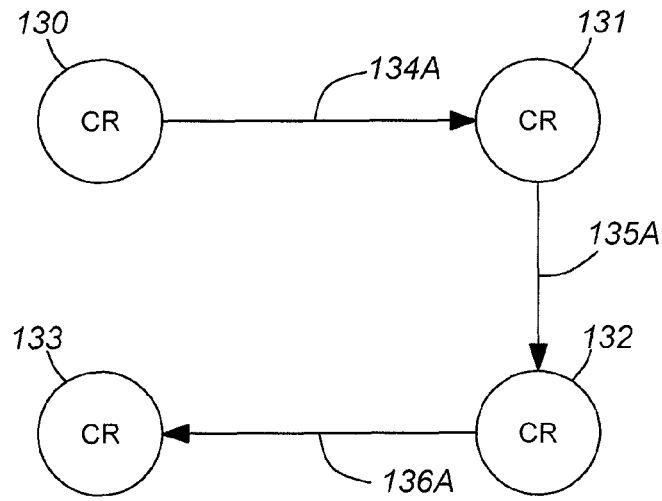
FIG. 10 shows a priority 0 spanning tree for a source content router after failure of a link.

When a link fails, the routing protocol distributes this notification as per the above-mentioned patent application Ser. No. 11/012,113. This allows the spanning trees for each source and each priority to be re-computed to reflect the new network topology. For example, if link 137A was to fail, the spanning tree for source content router 130, priority 0 would be recomputed to be that shown in FIG. 10. The spanning trees for the other priorities would not be affected by this link failure.

One or more link failures could result in a destination router being unreachable from the point of view of a given source router for a given document priority. To avoid this occurrence, the spanning tree for each priority is constructed using the algorithm shown in FIG. 17.

1. Links that support the document priority of interest are always preferentially used to construct the spanning tree. This is shown in step 200. A preferred method for computing the shortest path to each router in the network is Dijkstra's Algorithm, as known in the art. The algorithm minimizes the routing metric across the set of links selected to reach each destination router. Note that parameters other than routing metric can also be taken into account, such as link coloring, link utilization, etc. as is known in the art. At step 201, a check is made to see if each required router has been reached. If so, step 205 is reached and the algorithm is complete for the target priority. Otherwise, step 202 is reached.
2. If a link that supports the required document priority is not available to complete a path to a destination router, then at step 202 links of the next lowest available priority are used, if possible, to reach any unreachable routers after step 1. For example, for priority 2, if a path using only priority 2 links is not possible, then a path is constructed using priority 2 and priority 1 links, and if that is not possible, then a path is created using priority 2, priority 1, and priority 0 links. Note that available links that match the target priority are always used preferentially, and only when necessary, available links with the highest possible priority which is lower than the target priority are used. At step 203, a check is made to see if each required router has been reached. If so, step 205 is reached and the algorithm is complete for the target priority. Otherwise, step 204 is reached.

3. If all required destination routers are still not reachable, then at step 204 links of the next highest available priority are used if possible, to reach any unreachable routers after step 2. For example, for priority 2, if a path using only priority 2, 1 and 0 links is not possible, then a path is constructed using priority 2, 1, 0 and 3 links, in that preference order. Note that available links that match the target priority are always used preferentially, and only when necessary, available links with the highest possible priority which is lower than the target priority are used, and then if necessary, available links with the lowest possible priority which is higher than the target priority are used. The algorithm then completes at step 205. At this point, if any routers are not reachable, then there is no possible path to those routers.

The algorithm of FIG. 17 can be performed in a single step, using a scheme such as Dijkstra's Algorithm, as follows. When computing paths for a given priority, the routing metric for links of other priorities are made larger such that a link of a non-preferred priority has a routing metric which is larger than any possible path in the network for links of preferred priorities. The less preferred the priority is, the larger the routing metric adjustment is. For example, if all links in the network had a maximum routing metric value of 100, and a possible path could only have 10 hops, then the maximum path metric would be 1,000. Links of the next preferred priority could have their routing metric adjusted by an offset value of 5,000 (i.e. logically add 5,000 to the actual link routing metric); links of the next preferred priority could have their routing metric adjusted by an offset value of 250,000, and links of the least preferred priority could have their routing metric adjusted by 12,500,000. In this manner, the standard Dijkstra's Algorithm would preferentially choose links of the target priority, then the next preferred priority, etc.

Figure 17:
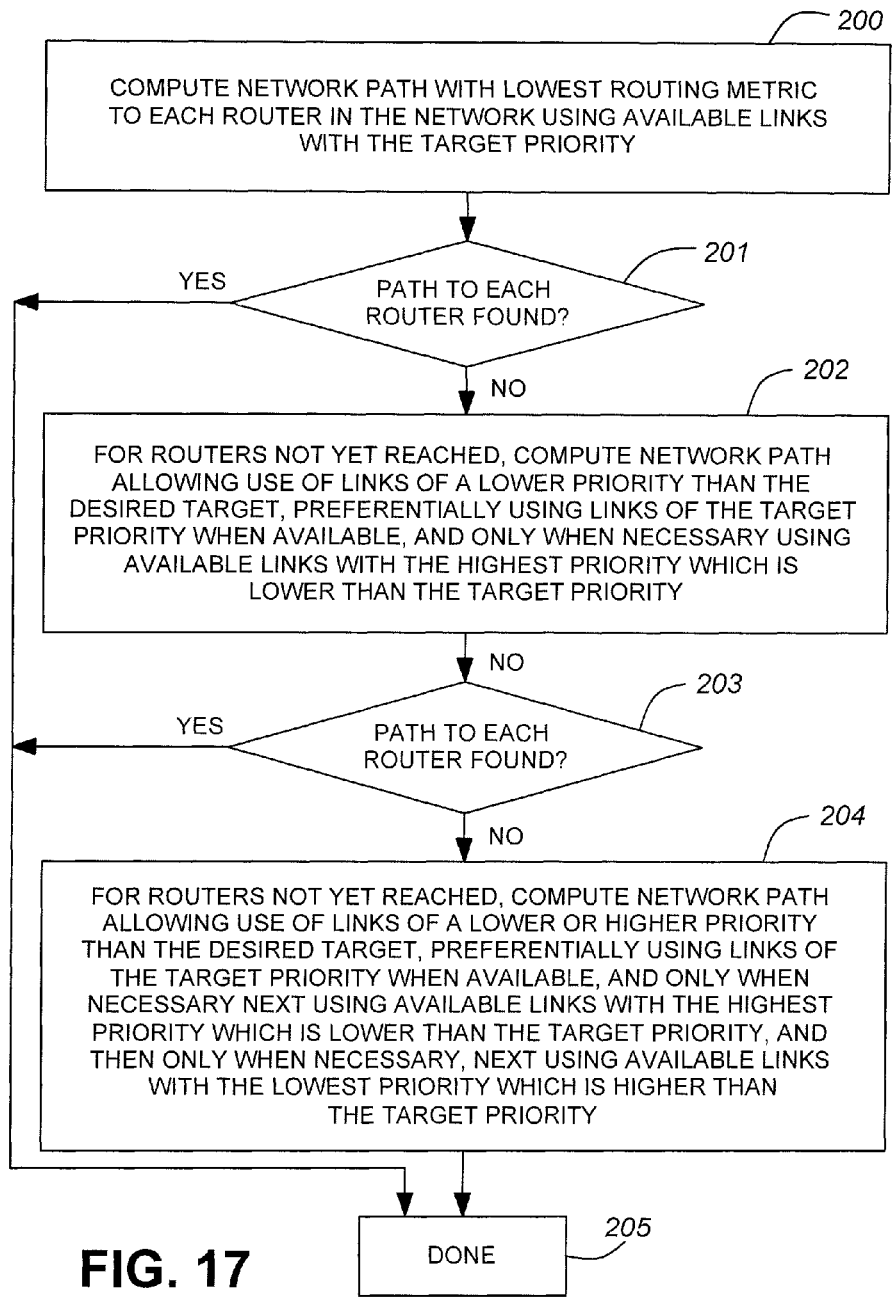
FIG. 17 shows an algorithm for selection of links for priority-based routing table construction.

The algorithm of FIG. 17 preferentially uses links of a lower priority when links of the target priority are not available, and only uses links of a higher priority when no lower priority links are available. This preferred algorithm is chosen to protect resources of higher priority links from being used by lower priority traffic unless absolutely necessary (for example, to avoid bandwidth contention). An alternate algorithm is to first use links of higher priority, and then consider links of lower priority. This would always give documents of a given priority at least the required quality of service.

Figure 11:
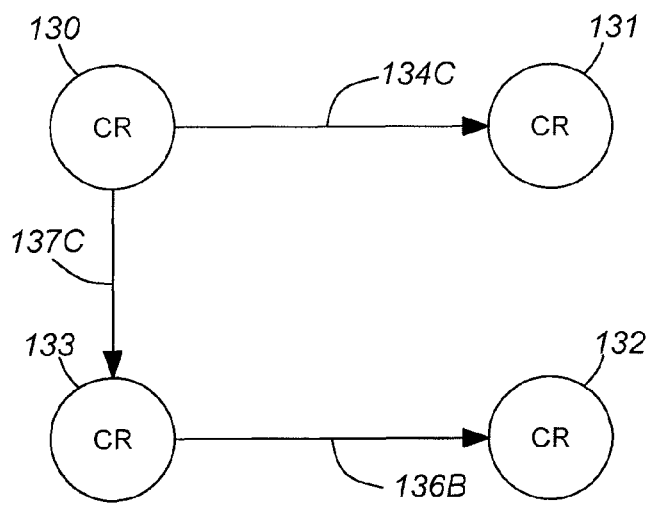
FIG. 11 shows a priority 3 spanning tree for a source content router after failure of two links.

As an example, in Table 4, consider the failure of links 134D and 135C. The spanning tree for source content router 130, priority 3 would become that shown in FIG. 11. In FIG. 11, documents from content router 130 destined to content router 131 are now sent over link 134C, which normally only carries priority 2 traffic as per table 4. In addition, the route to content router 133 is now via link 137C, and the route to content router 132 is now via links 137C and 136B. Note that links 137C and 136B are provisioned to carry priority 3 traffic and were chosen over a route that would involve link 134C towards content router 132.

It should also be noted that a more direct link for only a subset of the priorities could be added between a given pair of content routers. For example, in FIG. 5, there is no direct link between content routers 130 and 132. Such a direct link could be added, but only provisioned to carry priority 3 documents (the highest priority). Now, any priority 3 documents to be sent from content router 130 to content router 132 or vice versa would use this direct link, but other priority documents would transit through content routers 131 or 133 as earlier described.

Other policies are also possible other than the preferred embodiment described above. For example, the routing algorithm may wish to take into account other metrics or policies in addition to the document priority. For example, there could be a policy to limit the number of hops a document will need to take to reach a given destination content router, even if a lower or higher priority link must be used as a result.

Alternative Routing Methodology

An alternative embodiment to routing based on the document priority is as follows. Multiple links between content routers is still utilized as per the examples in FIG. 5 and Table 4. However, the content routing protocol is not modified to distribute details of each link, but rather represents the group of links between a given pair of content routers as a single link. For example, in FIG. 5, the four links 134A, 134B, 134C, and 134D between content routers 130 and 131 are distributed by the routing protocol as a single link. Thus, a single source-based graph per source content router is constructed, as described in the patent application "Implicit Routing in Content-Based Networks" referred to above as opposed to a per-source, per-priority graph. The link is reported as being up when at least one of the constituent links is operational. For example, even if link 134A is not operational, the status of the aggregated link distributed by the routing protocol is not affected. When a content router is to forward a document with a given priority, the priority is used to select the link of the link set. If the link that supports the required priority is not available, another link from the link set is chosen instead, using the rules described above, i.e. first a lower priority link is selected if possible, and if not, then a higher priority link is chosen. An advantage of this approach is that multiple links can be introduced to support quality of service into an existing network, without having to modify the existing content routing protocol. Another advantage is that the number of links held in the database of the link state routing protocol is reduced.

Another hybrid approach is to have the routing protocol only report one link to represent the link set between a pair of content routers, but to include the attribute that describes the set of priorities supported by the aggregate link. This has the advantage of still only requiring the reporting of a single link between content routers. If one of the constituent links changes states (e.g. fails), the aggregate link is re-distributed by the routing protocol with the set of supported priorities updated. In this manner, each router knows what priorities are currently supported over each link, and a per-source, per-priority graph can be constructed as described above, but the graphs will reference the aggregate links.

Queuing Based on Document Priority

Internal to the content router, once a document priority has been assigned to a document, it can be used to internally prioritize the treatment of the document within the content router. For example, when documents are queued to egress the router, per-priority queues can be utilized for each egress link. This allows queuing policies to control the order in which documents are emitted by the content router. For example, high priority documents should be sent preferentially over low-priority documents. Various queue strategies can be employed, such as weighted fair queuing. Egress bandwidth for each document priority can also be measured and controlled, ensuring that each priority gets a controlled percentage of the available bandwidth, for example. Egress priority queuing can be applied when determining the "next" link to service among all links with documents ready to transmit; and when queuing documents for transmission into a link when this link handles multiple priorities.

In addition, if the router is running low on resources, higher priority documents can be given precedence. For example, if the router is running out of memory 191 resources to buffer documents waiting for transmission, lower priority documents can be moved out of memory 191 onto persistent storage 193, to free up memory 191 resources for higher priority documents. Later, when memory 191 resources become available, the lower priority documents can be handled.

Priority servicing can also be employed by each router when receiving documents from other routers and deciding the order of processing and for transmitting to other routers or subscribers. For example, a receiving router can preferentially service high priority links from other router over lower priority links. In FIG. 5, if documents are available for ingress processing on link 134A and link 134B, content router 131 should first process traffic from link 134B, since link 134B is assigned a higher priority than link 134A as per Table 4 above. Note that for ingress priority servicing, documents can be serviced in strict priority order (from highest to lowest), or using techniques such as weighted round robin, as known in the art.

Furthermore, egress priority queuing can be applied to documents within a connection when delivering documents over a given connection. For example, in reference to FIG. 1, when delivering documents from content router 4 to subscriber 26 along the single link 47, content router 4 could priority queue outgoing documents destined to subscriber 26 in order to give better service (reduced latency and reduced probability of loss) to higher priority documents. As another example, in reference to FIG. 5, link 136A carries documents of priority 0 and priority 1 as per Table 4 above. If documents of priority 0 and priority 1 are queued for egress on link 136A, priority 1 documents should be transmitted preferentially over priority 0 documents. Note that even if a link is only provisioned to carry a single priority, such as link 134A, as per the algorithm in FIG. 17 the link may be used to carry multiple document priorities due to other links not being available. In this situation, egress priority queuing can again be used to preferentially deliver higher priority documents over lower priority documents. Note that for egress priority queuing, documents can be serviced in strict priority order (from highest to lowest), or using techniques such as weighted round robin, as known in the art.

Figure 18:
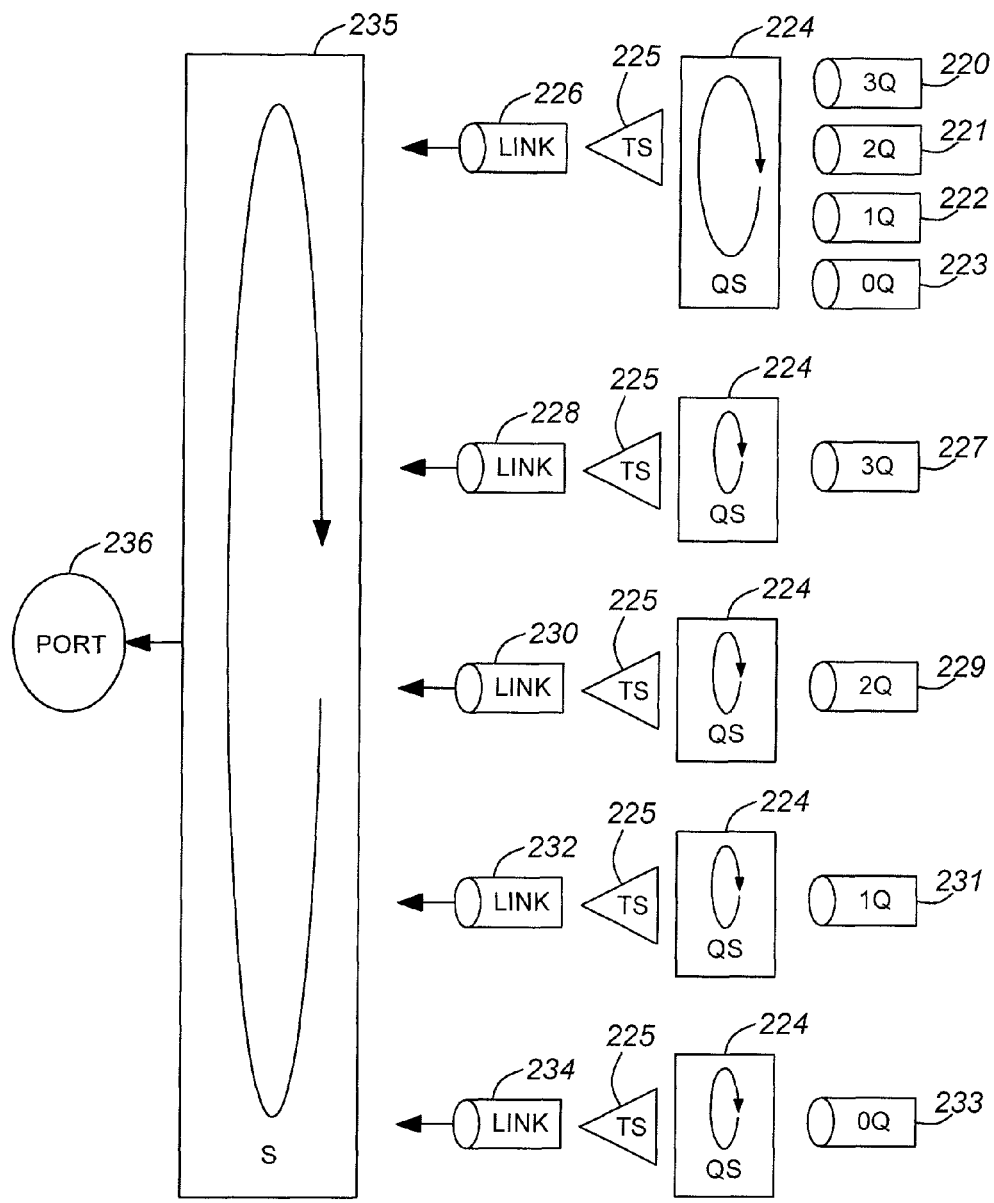
FIG. 18 shows egress queue servicing.

Referring to FIG. 18, three levels of egress QoS mechanisms are shown: priority queue servicing of documents into a connection, rate limiting connections, and multiplexing of connections into a port. Note that some of these mechanisms can optionally be omitted. Link 226 serves four priorities; each priority has its own priority queue: queue 220 for priority 3, queue 221 for priority 2, queue 222 for priority 1, and queue 223 for priority 0. Queue servicing block 224 reads from the queues 220 through 223 using the selected servicing algorithm, such as weighted round robin or strict priority order. Block 225 then carries out traffic shaping to control the amount of bandwidth utilized by link 226. The traffic is then sent to link 226 (which may be a TCP connection for example, or other technologies described below). This is an example of a link 226 carrying multiple document priorities.

Link 228 only carries priority 3 documents, with associated queue 227. Link 230 only carries priority 2 documents with associated queue 229. Link 232 only carries priority 1 document, with associated queue 231, and link 234 only carries priority 0 documents, with associated queue 233. In this case the queue servicing block 237 each has one queue to service.

Scheduling block 235 then schedules traffic from each link as they are multiplexed onto port 236. Again, different scheduling techniques can be used, such as weighted round robin, strict priority, or various calendaring mechanisms as known in the art. Note that port 236 could be further broken down into logical ports, e.g. through the use of virtual LANs in the case of an Ethernet port, or channels in a channelized TDM or SONET interface, etc. In this case, another layer of queue servicing and traffic shaping can be introduced, to shape traffic into virtual LANs or channels, and then schedule traffic from each virtual LAN or channel onto the physical port.

Mapping Document Priorities to Diffserv Code Points

Differentiated Services (Diffserv) is defined in RFC 2474, "Definition of the Differentiated Services Field (DS Field) in the IPv4 and IPv6 Headers", December 1998, The Internet Society (IETF).

Figure 12:
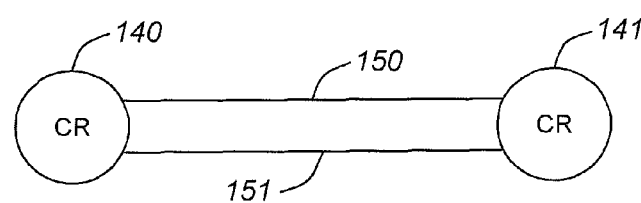
FIG. 12 shows a content-routed network using two links between a pair of content routers.

FIG. 12 shows a subset of a content-routed network consisting of two content-routers 140 and 141 connected by two links 150 and 151. For example, link 150 can be provisioned to carry document priorities 0 and 1, while link 151 can be provisioned to carry document priorities 2 and 3.

Figure 13:
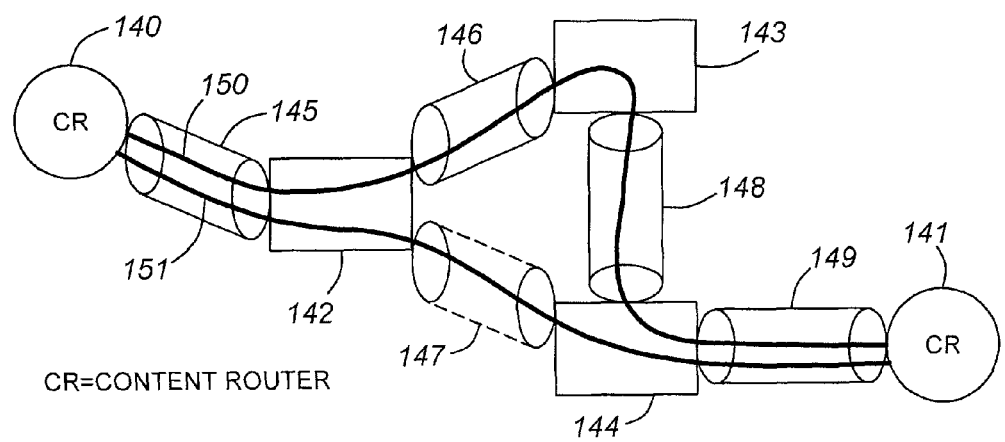
FIG. 13 shows a content-routed network over-laid onto a Diffserv-Enabled IP network.

If the content-routed network is over-laid on to an IP network that supports Diffserv, then document priorities can be mapped to DiffServ code points to affect an end-to-end quality of service across the content-routed network, taking advantage of the Differentiated Services offered by the underlying IP network. This is illustrated in FIG. 13. In FIG. 13, the two content routers 140 and 141 of FIG. 12 are still connected by the two links 150 and 151, but the links are carried over an IP network. The IP network consists of IP routers 142, 143 and 144. Content router 140 connects to IP router 142 over physical link 145. IP router 142 is connected to IP routers 143 and 144 via physical links 146 and 147 respectively. IP routers 143 and 144 are connected via physical link 148. Finally, content router 141 is connected to IP router 144 via physical link 149. The physical links can utilize a variety of technologies, such as Ethernet, SONET, SDH, etc. Note also that the content routers 140 and 141 can also provide IP routing functionality in addition to the content-routing functions.

The content routers are provisioned to have a configurable Differentiated Services Code Point (DSCP), in the range of 0 to 63 as per RFC 2474, per logical link, such as 150 and 151. When the logical link 150 and 151 are established (e.g. via TCP in the preferred embodiment), the provisioned Diffserv code point is set in each IP packet for the flow. This allows the underlying IP network (routers 142, 143 and 144) to treat each TCP flow 150 and 151 with the quality of service appropriate for the signalled Diffserv code point. This can include queuing disciplines, route used, etc. as is known in the art. For example, in FIG. 13, a different route is used for 150 and 151 in the IP network, due to the different Diffserv code point (DSCP) used for each TCP connection.

As was explained above in reference to FIG. 2, a pair of TCP connections is used in the preferred embodiment when using HTTP over TCP between content routers. Thus, in FIG. 12, link 150 between content router 140 and content router 141 is actually a pair of TCP connections, and link 151 is also comprised of a pair of TCP connections.

In FIG. 13, assume that the IP address of content router 140 is 10.10.10.1, and the IP address of content router 141 is 10.10.10.2. Also assume that both content routers are using TCP port 80 to accept incoming TCP connections.

Table 5 gives an example configuration for content router 140 of the connections that it is to have to neighbour content router 141. In Table 5, entry 152 indicates that a TCP connection is to be made to far-end IP address 10.10.10.2, far-end TCP port number 80. This connection will be used to send documents to content router 141 that have a priority of 2 or 3. The DSCP value to be used for this TCP connection is 18; that is, content router 140 will mark each IP packet that is sent as part of this TCP flow with a DSCP value of 18. Entry 153 indicates that another TCP connection is also to be made to far-end IP address 10.10.10.2, far-end TCP port number 80. This connection will be used to send documents to content router 141 that have a priority of 0 or 1. The DSCP value to be used for this TCP connection is 10.

TABLE 5

DSCP Settings for content router 140

| | Destination IP Address | Destination TCP Port | Priorities Carried | DSCP |
|---|---|---|---|---|
| 152 | 10.10.10.2 | 80 | 2, 3 | 18 |
| 153 | 10.10.10.2 | 80 | 0, 1 | 10 |

Table 6 gives an example configuration for content router 141 of the connections that it is to have to neighbour content router 140. In Table 6, entry 154 indicates that a TCP connection is to be made to far-end IP address 10.10.10.1, far-end TCP port number 80. This connection will be used to send documents to content router 140 that have a priority of 2 or 3. The DSCP value to be used for this TCP connection is 18; that is, content router 141 will mark each IP packet that is sent as part of this TCP flow with a DSCP value of 18. Entry 155 indicates that another TCP connection is also to be made to far-end IP address 10.10.10.1, far-end TCP port number 80. This connection will be used to send documents to content router 140 that have a priority of 0 or 1. The DSCP value to be used for this TCP connection is 10.

TABLE 6

DSCP Settings for content router 141

| | Destination IP Address | Destination TCP Port | Priorities Carried | DSCP |
|---|---|---|---|---|
| 154 | 10.10.10.1 | 80 | 2, 3 | 18 |
| 155 | 10.10.10.1 | 80 | 0, 1 | 10 |

With the example configuration of Table 5 and Table 6, content router 140 will establish two TCP connections to content router 141. Since both connections go to the same destination port number on content router 141, it does not know, just by accepting the connection, what document priorities is to be carried by which connection. The DSCP code point is associated with the entire TCP flow, and so has to be set for each TCP flow. On the content router establishing the TCP connection, it knows the DSCP value to use from the configuration data it used to create the connection (i.e. Table 5 and Table 6). However, the content router accepting the TCP connection does not know which DSCP value to use. This information is sent from the content router establish the TCP connection to the content router accepting the TCP connection as follows. After the connection is established, the content router that established connection sends an initial HTTP message with information indicating the priority or priorities supported by the link. For example, such a message can be

```
POST /host HTTP/1.1
<XmlLinkProtocol><Priority>2,3</Priority></XmlLinkProtocol>
``` which is sent initially on a link which supports priorities 2 and 3. The message is an HTTP POST message which carries an XML document which describes the configuration of the link.

In the XML document, the <XmlLinkProtocol> tag indicates that the message describes the configuration of the link, and value or values inside the <Priority> tag describe the priorities supported by the link. If more than one priority is supported, a comma-separated list of values is provided. This message is sent over a link that supports priorities 2 and 3, such as the link described by the configuration 152 of Table 5 and 154 of Table 6.

The following message can be sent over a link that supports priorities 0 and 1, such as the link described by the configuration 152 of Table 5 and 155 Table 6:

```
POST /host HTTP/1.1
<XmlLinkProtocol><Priority>0,1</Priority></XmlLinkProtocol>
```

Upon receiving such a message, the receiving content router uses the priority value or values, and consults its link configuration data (such as in Table 6 for content router 141) to determine the DSCP value it is to use for transmissions it makes on the TCP connection. It then sets the DSCP for the TCP link. Note that normally the DSCP value will be the same in each direction of transmission on a given TCP session, but this is not required, and this method allows each content router to use its own configuration to set the DSCP value.

Note that when using HTTP to transfer documents between content routers, the HTTP request, which carries the HTTP document, is responded to with an HTTP response, as is known in the art. For example, in FIG. 13, if content router 140 sends an HTTP request containing an XML document over link 150 to content router 141, the HTTP response for this request must also travel over link 150 from content router 141 back to content router 140. This is done by simply always using the same TCP session to send the HTTP response back for the received HTTP request.

The act of mapping an XML document to a document priority based on matching rules on the content, as opposed to just using header information such as source and destination addresses as in non-content networks, performing priority queuing on ingress and egress of the router, and then routing the document in the content-routed network based on this document priority, and furthermore mapping document priority to a DSCP for treatment by the underlying IP network, allows quality of service to be delivered throughout the network, even though the underlying IP network does not understand how to process the contents of XML documents.

Figure 14:
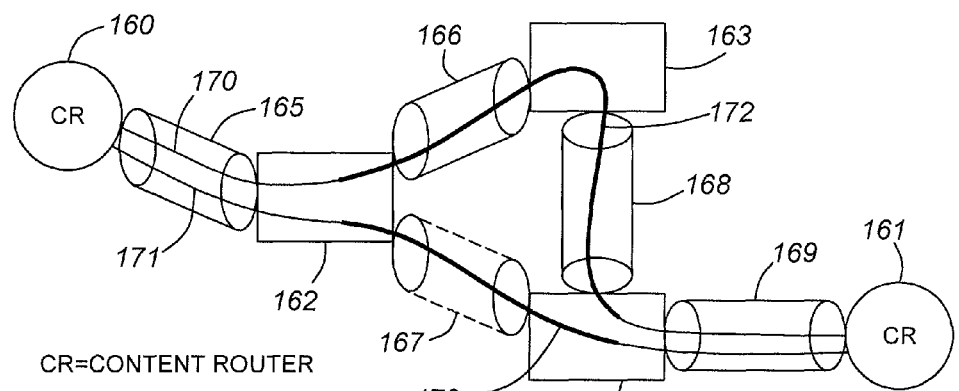
FIG. 14 shows a content-routed network over-laid onto an MPLS-Enabled network.

Diffserv code points can also be used in conjunction with an MPLS network. This is illustrated in FIG. 14. Content router 160 is connected to MPLS Label Edge Router (LER) 162 via physical link 165. Content router 161 is connected to MPLS LER 164 via physical link 169. MPLS LER 62 and MPLS LER 164 are interconnected via physical link 167. MPLS Label Switch Router (LSR) 163 is connected to MPLS LER 162 via physical link 166, and to MPLS LER 164 via physical link 168. In the MPLS network, two Label Switch Paths (LSP) have been provisioned with traffic engineering parameters to provide the desired quality of service (QoS) for each LSR. Traffic engineering parameters include items such as bandwidth, latency, traffic priority, resiliency requirements (i.e. whether the LSP is automatically re-routed around a failure in the MPLS network), etc. In the example, LSP 172 has been provisioned to provide a normal quality of service, while LSP 173 has been provisioned to provide a high quality of service. The two content routers 160 and 161 are connected via two logical links (TCP connections) 170 and 171. Each logical link has been assigned a DSCP as described above. At MPLS LER 162, a traffic matching rule has been provisioned so that any IP traffic destined to the IP address of content router 161 with the DSCP code assigned to flow 170 is mapped into LSP 172, while any IP traffic destined to the IP address of content router 161 with the DSCP code assigned to flow 171 is mapped into LSP 173. Likewise, at MPLS LER 164, a traffic matching rule has been provisioned so that any IP traffic destined to the IP address of content router 160 with the DSCP code assigned to flow 170 is mapped into LSP 172, while any IP traffic destined to the IP address of content router 160 with the DSCP code assigned to flow 171 is mapped into LSP 173. In this way, the flows between the content routers, which provide for XML document QoS, is mapped onto the QoS service provided by the underlying MPLS network.

Note that in FIG. 14, the LSPs are assumed to allow for bi-directional data flow. In reality, this involves setting up a uni-directional LSP in each direction. LSP 172 in FIG. 14 will consist of a pair of LSPs, one established from IP router 162 to IP router 164, and carries data in the direction of establishment, and a second LSP established from IP router 164 to IP router 162. The same applies to LSP 173.

It should also be noted that multiple flows, each with a different DSCP, can be mapped into the same LSP, using an E-LSP as per RFC 3270, "MPLS Support of Differentiated Services", May 2002, The Internet Society (IETF). With an E-LSP, different qualities of service can still be offered within a single LSP, although resiliency (i.e. whether the LSP is re-routed or not) is common.

Mapping Document Priorities Directly to MPLS

Figure 15:
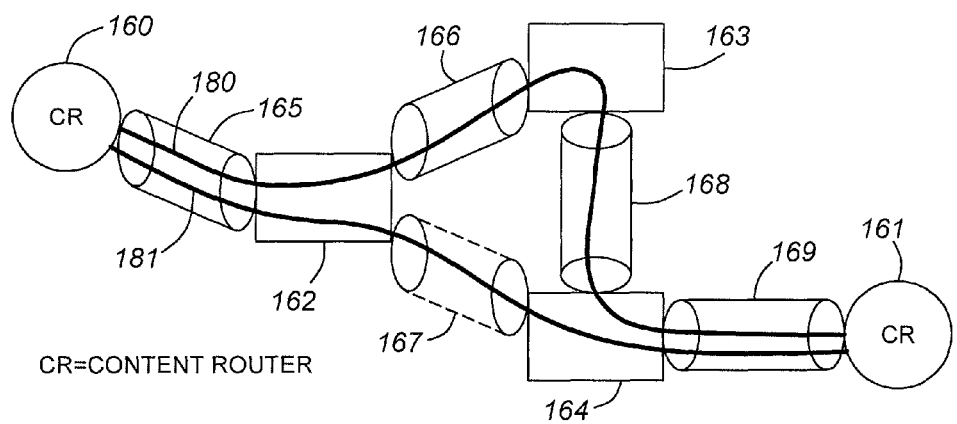
FIG. 15 shows a second embodiment of a content-routed network over-laid onto an MPLS-Enabled network.

Another method to provide QoS is to have the content routers be part of the MPLS network and directly signal LSPs using a label distribution protocol, as is known in the art. This is illustrated in FIG. 15. The labels in FIG. 15 that are common to FIG. 14 are shared, and the description is omitted. In FIGS. 15, 162 and 164 are now serving as MPLS Label Switch Routers (LSR) as opposed to MPLS Label Edge Routers (LER). The content routers 160 and 161 also act as MPLS Label Edge Routers (LER). The links between the content routers are now accomplished using MPLS Label Switch Paths (LSP), which are signalled from one content router to the other over the MPLS network, using a label distribution protocol such as RVSP-TE. LSP 180 may be defined to have a normal quality of service, while LSP 181 is defined to have a higher quality of service. In this case, these LSPs could be L-LSPs (Label-inferred) as is known to those knowledgeable in the art. Document priorities 0 and 1 map onto LSP 180, while document priorities 2 and 3 map onto LSP 181. If LSP 180 and LSP 181 are E-LSP, further differentiation inside the MPLS network can be provided for the two document priorities that reside inside the same LSP by using different EXP bit markings in the header of each MPLS packet. If E-LSPs are used, then a single LSP between content routers 160 and 161 could suffice, with different EXP field values used for documents of different priority. Note also that the "LSP" described previously could simply be a tunnel LSP with a single label, or label stacking could be employed. Again note that LSPs are uni-directional, and LSPs have to be set up in each direction to enable bi-directional data flow. The configuration information required for each LSP to be established by a content router would be provisioned on each content router.

Other Network Technologies

It will be appreciated by one skilled in the art that there exists a plurality of other networking technologies for which content prioritization of documents can be mapped onto to achieve end-to-end quality of service. For example, FIG. 15 could instead represent an ATM network, and 180 and 181 could represent ATM virtual circuits (or virtual paths) that are signalled by the content routers across an ATM network, using an ATM signalling protocol such as ATM Forum UNI 4.0, or ATM Forum PNNI 1.0, or a provisioned Permanent Virtual Circuit (or Path). Each ATM virtual circuit (or path) has set of traffic parameters which indicate that quality of service to be guaranteed by network. By mapping the document priorities to the ATM virtual circuit (or path) connecting two content routers, end-to-end quality of service can be provided, based on the content of the documents being routed.

Another example is a Frame Relay network, where the logical links between content routers is done via a Frame Relay circuit, which again can be done via a signalled connection or a provisioned connection. Each Frame Relay circuit has an associate traffic descriptor to provide quality of service.

For Ethernet interfaces, Ethernet priority can be used tag each link between content routers with an appropriate Ethernet priority, which allows Ethernet switching equipment to give higher precedence to higher priority flows.

It will be appreciated by persons skilled in the art that many variants of the invention are possible.

All references mentioned above are herein incorporated by reference.

We claim:

1. A method of routing documents in a content-based network including a plurality of content-based routers wherein one or more of said content-based routers serve as ingress routers, said method comprising:

a) providing groups of links between pairs of said content-based routers, wherein individual links within each group of links are dedicated to different priorities associated with different qualities of service, and wherein each link is associated with a cost metric, and wherein a given priority is only assigned to a single link of each group and each link of each group is assigned to one or more priorities, and each link is associated with a priority attribute listing the priority(ies) to which the link is dedicated;

b) receiving at a said ingress router an incoming document from a publisher;

c) determining the identity of the publisher from said incoming document;

d) examining content of said incoming document and matching said content against a set of subscriptions to identify interested subscribers for said document;

e) identifying one or more egress content-based routers associated with said interested subscribers;

f) storing a plurality of sets of rules defining the assignment of priority to incoming documents at said ingress router in accordance with a publisher identity and expressions contained in said incoming documents, said expressions describing the nature of the documents, wherein different publishers are associated with different sets of rules, and the assigned priority represents a quality of service expressed as a value;

g) for a particular incoming document matching an expression contained in that document against the stored set of rules associated with the identified publisher for that document to assign a target priority to that document based on the identity of the publisher and the matching expression contained in that document;

h) tagging said particular incoming document at the ingress router with the target priority determined in step g;

i) computing a network path from the ingress router to each other content-based router for each priority by:
   1) for each priority identifying the network path to each content-based router over links of that priority having the lowest cost metric, and
   (2) for content-based routers unreachable under (1) for any particular priority computing the network path using links of the particular priority where available but using links of different priority closest to the particular priority when links of the target priority are unavailable; and j) routing said incoming documents toward said one or more content-based routers identified in step e over the network path(s) computed in step (i) for the target priority.

2. The method of claim 1, wherein the quality-of-service is expressed as one of n priority values, where n is an integer.

3. The method of claim 1, wherein the attribute of the incoming document is first compared against said stored set of rules to look for an exact matching entry for the associated publisher, and in the event of one or more exact matching entries the incoming document is assigned the highest priority of the matching entries.

4. The method of claim 3, wherein in the event of no match being found against the associated publisher, the attribute of the incoming document is compared against wildcard publisher rules to look for a matching entry.

5. The method of claim 4, wherein in the event of no match being found against any wildcard publisher rule, the incoming document is matched against default rules for the associated publisher.

6. The method of claim 5, wherein in the event of no match being found in the default rules for the associated publisher, the incoming document is then matched against a wildcard default rule.

7. The method of claim 4, wherein in the event of their being more than one match, the document is assigned the highest priority for all matching entries.

8. The method of claim 1, wherein said expressions are Xpath expressions.

9. The method of claim 1, wherein XPath language is used to express rules on a per-publisher basis for assigning said priorities to incoming documents.

10. The method of claim 9, wherein XPath language is used to express wild-card rules for any publisher when no rule matches for the particular publisher are found.

11. The method of claim 1, wherein said assigned priority is used for internal resource management as the document is routed through the network.

12. The method of claim 11, wherein said internal resource management is queuing priority.

13. The method of claim 12, wherein content-based routers receiving documents from other routers in the network use the assigned priority for controlling ingress and egress queues.

14. The method of claim 11, wherein said internal resource management has priority for allocation of memory resources.

15. The method of claim 1, wherein said documents are forwarded using a content-routing protocol that includes an extension to report each link between content routers along with the set of priorities mapped to each link.

16. The method of claim 15, wherein routing decisions in said content-based network are made using per-source, per-priority spanning trees.

17. The method of claim 1, wherein said documents are carried on links mapped to a Differentiated Services Code Point (DSCP) for interaction with a Diffserv enabled network to achieve Quality-of-Service capability.

18. The method of claim 17, wherein Differentiated Services Code Point (DSCP) is mapped onto a Multiprotocol Label Switching (MPLS) Label Switch Paths (LSP) to achieve Quality-of-Service capabilty.

19. The method of claim 18, wherein DSCP is mapped onto an MPLS LSP by a technique selected from the following group: L-LSP and E-LSP.

20. The method of claim 1, wherein said links are established between content-based routers in said content-based network using networking technologies selected from the group consisting of: IP, ATM, Ethernet, MPLS, and frame relay, and quality of service is managed using the quality-of-service capabilities of these technologies.

21. The method of claim 1, wherein the priority assigned to the incoming document is sent on to the next router along with that document.

22. The method of claim 21, wherein a downstream content-based router receiving an incoming document from an ingress router re-computes the priority assignment for the document according to local policy for the downstream router.

23. The method of claim 1, wherein said documents are forwarded using a content-routing protocol that includes an extension to report an aggregate link between content routers along with the set of priorities mapped to the aggregate link.

24. The method of claim 23, wherein routing decisions in said content-based network are made using per-source, per-priority spanning trees.

25. A content-based network comprising a plurality of content-based routers,
   wherein pairs of said content-based routers are interconnected by groups of links, and wherein the links within each group are dedicated to different priorities associated with different qualities of service, and wherein each link is associated with a cost metric, and wherein a given priority is only assigned to a single link of each group and each link of each group is assigned to one or more priorities, and each link is associated with a priority attribute listing the priority(ies) to which the link is dedicated;
   wherein one or more of said content-based routers constitute ingress routers;
   wherein said ingress routers are configured to examine content of an incoming document received from a publisher and match the content of said document against a set of subscriptions to determine interested subscribers for said document and to determine an identity of the publisher;
   wherein said ingress routers are configured to identify one or more egress routers associated with the interested subscribers;

wherein said ingress routers are configured to store a plurality of sets of rules defining the assignment of priority to documents in accordance with a publisher identity and expressions contained in said documents, said expressions describing said documents, wherein different publishers are associated with different sets of rules, and the assigned priority represents a quality of service expressed as a value;

wherein said ingress routers are configured to assign a target priority to a particular incoming document by comparing an expression contained in the particular incoming documents against the stored set of rules associated with the identified publisher for that particular document, said ingress routers being configured to tag said particular incoming document with the assigned target priority; and wherein said ingress routers are configured to compute a network path to each other content-based router for each priority by:

1) for each priority identifying the network path to each content-based router over links of that priority having the lowest cost metric, and (2) for content-based routers unreachable under (1) for any particular priority computing the network path using links of the particular priority where available but using links of different priority closest to the particular priority when links of the target priority are unavailable, said content-based routers further being configured to route said incoming document toward one of more of said other content-based routers over the computed network path(s) to said one or more other content-based routers for the target priority.

26. The content-based network of claim 25, wherein said ingress routers are configured to assign the incoming document the highest priority of the matching entries in the event of one or more exact matching entries.

27. The content-based network of claim 26, wherein in the event of no match being found, said ingress routers are configured to compare the content of the incoming document against wildcard publisher rules to look for a matching entry.

28. The content-based network of claim 27, wherein in the event of one or more exact matching entries the ingress router is configured to assign the incoming document the highest priority of the matching entries.

29. The content-based network of claim 27, wherein in the event of no match being found against any publisher, said ingress routers are configured to match the incoming document to a set of stored default rules for the identified publisher, and if a match is still not found, match the incoming document against a wildcard default rule.

30. The content-based network of claim 26 wherein said ingress routers are configured to map the assigned priority onto an egress link, and map the egress links onto an interconnect network between content-based routers to achieve end-to-end quality of service.

31. The content-based network of claim 25, comprising one said link for each assigned priority.

32. A content-based router for use as an ingress router in a content routed network, comprising:

a plurality of egress links for connection to other content-based routers, wherein groups of egress links are assigned to each other content-based router, and wherein individual links within said groups of links are dedicated to different priorities associated with different qualities of service, and wherein a given priority is only assigned to a single link of each group and each link of each group is assigned to one or more priorities, and each link is associated with a priority attribute listing the priority(ies) to which the link is dedicated and a cost metric;

a memory for storing a plurality of sets of rules defining the assignment of priority to documents in accordance with a publisher identity and expressions contained in said documents describing said documents, wherein different publishers are associated with different sets of rules; and a processor programmed to identify the publisher of a particular incoming document and compare content of that particular incoming document with a set of subscriptions to determine interested subscribers for that particular document;

said processor being programmed to compare an expression in the particular incoming document against said stored set of rules associated with the identified publisher for that document and assign a target priority to said incoming document based on said comparison, said processor being programmed to tag said particular incoming document with the assigned target priority, and wherein the target priority represents a quality of service expressed as a value; and said processor being programmed to compute a network path to each other content-based router for each priority by:

1) for each priority identifying the network path to each content-based router over links of that priority having the lowest cost metric, and (2) for content-based routers unreachable under (1) for any particular priority computing the network path using links of the particular priority where available but using links of different priority closest to the particular priority when links of the target priority are unavailable, said processor further being programmed to forward said document to another content-based router over the computed network path(s) to that content-based router for the target priority;

whereby said document can be routed through the network in accordance with its assigned priority to provide quality-of-service control in the network.

33. The content-based router of claim 32, which is configured to assign the incoming document a priority value selected from a group of n values, wherein n is an integer.

34. The content-based router of claim 32, which is configured to map the assigned priorities onto egress links for said router.

35. The content-based router of claim 32, wherein each said link is associated with a respective assigned priority.

* * * * *